United States Patent [19]

Goebel, Jr.

[11] 4,214,065

[45] Jul. 22, 1980

[54] REINFORCED POLYLACTAMS

[75] Inventor: Charles V. Goebel, Jr., Wyomissing, Pa.

[73] Assignee: The Polymer Corporation, Reading, Pa.

[21] Appl. No.: 971,926

[22] Filed: Dec. 21, 1978

[51] Int. Cl.² ............................................... C08K 9/06
[52] U.S. Cl. .................................... 528/27; 260/37 N
[58] Field of Search ........................ 260/37 N; 528/27

[56] References Cited

U.S. PATENT DOCUMENTS

| 3,833,534 | 9/1974 | Tierney | 260/37 N |
| 3,839,065 | 10/1974 | Overhults et al. | 260/37 N X |
| 3,846,367 | 11/1974 | Burton | 260/37 N |
| 3,959,327 | 5/1976 | Pepe et al. | 528/27 |

FOREIGN PATENT DOCUMENTS 1226775 3/1971 United Kingdom.

Primary Examiner—Sandra M. Person
Attorney, Agent, or Firm—Richard O. Church

[57] ABSTRACT

Reinforced polylactams are disclosed in which the polylactam chains are bound by the common attachment of their ends to discrete filler particles. The polymer is prepared by the base catalyzed anionic polymerization of lactams in which a precursor initiator species is chemically attached to the surface of the filler particles and polymerization is initiated at and proceeds from the surface of the filler particles.

7 Claims, No Drawings

REINFORCED POLYLACTAMS

BACKGROUND OF THE INVENTION

1. Field of the Invention

This invention relates to the base catalyzed anionic polymerization of lactams and, more particularly, to reinforced polylactams in which an initiator precursor is coupled to the surface of the filler.

2. Description of the Prior Art

The use of fillers in polymeric systems is old and well known. At the one extreme fillers are used as diluents to make the polymer less expensive. At the other extreme fillers are used to enhance the physical properties of the polymer. Broadly speaking, fillers may be considered any foreign material in the polymer but, for purposes of this invention, the word "fillers" is used to mean particulate inorganic matter, such as minerals and glass fibers, having surfaces that are chemically reactive with silicate ester coupling agents.

The term "reinforced polymers" has many nuances ranging from one indicating that the filler material is bound by covalent bonds to the polymeric chain to one which merely indicates that the filler material contributes to a significant beneficial increase in physical properties of the polymer. The reinforced polylactams as disclosed in this specification embrace both of these definitions.

The prior art recognizes that polylactams can be reinforced with fillers by use of chemical coupling agents that have two reactive end groups. One of these end groups is effective to bond to the filler and the other end group is effective to react, during polymerization, to the polymerizing chain either along its backbone or by terminating the polymeric chain. Chemical coupling agents of this type are disclosed, for example, in U.S. Pat. Nos. 3,410,831; 3,341,501 and 3,418,268. Of the chemical coupling agents that have, in practice, been most frequently utilized are those of the type in which one end group is a silicate ester that is reactive with the surface of the filler particle and the other end group is an amine which will react to terminate the polymerizing chain. Typical of these coupling agents are silicate ester amines commonly used as sizing for fiberglass such as triethoxysilyltrimethyleneamine sold by Dow Corning under its trade designation A-1100.

The coupling system used in the prior art to reinforce polylactams can make useful contributions to the physical properties of polylactams but variously suffer from the fact that the reaction with the growing polymeric chain to form pendant groups may be random or erractic and, to the extent that they form a terminal group, limit the desired degree of polymerization.

OBJECTS OF THE INVENTION

Accordingly, it is an object of this invention to prepare reinforced polylactams.

A further object of this invention is to provide methods for reinforcing polylactams during polymerization without inhibiting the degree of polymerization.

A further object of this invention is to provide for greater uniformity and reproducability in the reinforcement of polylactams.

Another object of this invention is to provide polylactams, and methods for their manufacture, in which the fillers serve both as reinforcing and cross-linking agents.

Briefly, these and other objects of this invention are achieved reacting silicate esters with ketenes to form a $\beta$-ketoamide silicate ester that will serve both as a coupling agent and a precursor initiator species for the anionic polymerization of lactams. This compound is then reacted with the surface of the filler to form a filler/initiator precursor which will initiate polymerization and form a situs from which the polymeric chains may grow and through which the polymeric chains are cross-linked.

(A) The General Polymerization System

This invention is particularly concerned with the polymerization of lactams that can be initiated at temperatures of the order of about 80° C. or higher, and generally below the melting point of the resulting polylactam, by the anionic polymerization of such lactams in the presence of specific initiator compounds such as N-substituted imides (e.g., N-acyl lactams, cyclic imides of dicarboxycyclic acids, etc., N-acyl sulfonamides, and various thioacyl analogs, isocyanates, and N,N'-disubstituted and trisubstitued ureas and thioureas). These polymerization processes are discussed more completely, for example, in U.S. Pat. Nos. 3,017,391; 3,028,369; and 3,086,962.

(B) The Catalyst System

Suitable anionic catalysts in the polymerization of lactams are any of the metals, which can be in metallic, complex ion or compound form, that are capable of forming lactam salts (e.g., sodium and caprolactam to form sodium caprolactam). Common examples of such catalysts suitable for the anionic polymerization of the high lactams are the alkali and alkaline earth metals, e.g., sodium, potassium, lithium, calcium, strontium, barium, magnesium, etc., either in metallic form or in the form of hydrides, borohydrides, oxides, hydroxides, carbonates, etc. However, in the case of compounds such as the hydroxides and carbonates which give off water when reacted with lactams, the bulk of such water preferably is removed so that the polymerization may be conducted under substantially anhydrous conditions. This may be achieved by forming a catalyst concentrate by prereacting a catalyst and lactam, removing any undesired reaction products, such as water, hydrogen, or carbon dioxide, by means of heat and/or reduced pressures, from the concentrate, in desired proportions, to additional quantities of a lactam immediately prior to polymerization.

Other effective catalysts are the organo-metallic derivatives of the foregoing metals, as well as of other metals. Examples of such organo-metallic compounds are the lithium, potassium, and sodium alkyls, such as butyl lithium, ethyl potassium, or propoyl sodium, or the aryl compounds of such metals, such as sodium phenyl, triphenylmethyl sodium, and the like. Other suitable organo-metallic compounds are diphenyl magnesium, zinc diethyl, triisopropyl aluminum, diisobutyl hydride, etc.

As a general class, the materials known as Grignard reagents are also effective base catalysts for the present polymerization. Typical of such Grignard catalysts are ethyl magnesium chloride, methyl magnesium bromide, phenyl magnesium bromide, and the like. Other suitable anionic polymerization catalysts are sodium amide, magnesium amide, and magnesium anilide, as well as numerous others.

The catalyst concentration employed in the instant process may vary from a small fraction of 1 mole percent, e.g., from about 0.01 mole percent, to as much as 15 to 20 mole percent, based on the lactam monomer. In general, however, the preferred catalyst concentrations will vary from about 0.05 to about 5 mole percent, and more preferably still, from about 0.1 to about 1 mole percent.

(C) The Lactams

The lactams useful in this invention are those that may generally be classed as the higher lactams that contain at least 3 carbon atoms in the lactam ring. These higher lactams are useful in that they may readily be polymerized in the low temperature polymerization processes. These polymerizations take place with rapidity and, particularly when conducted at temperatures below the melting point of the resulting polylactams, result in a high conversion (e.g., at least 95%) from monomer to polymer.

The higher lactams with which this invention is concerned may be generally illustrated by the formula:

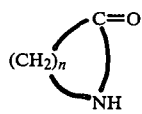

wherein n is an integer of at least 2 and up to 15, and preferably wherein n is an integer from 5 to about 12.

(D) The Initiator Systems

The filler/initiator precursors utilized in this invention are prepared by first reacting a ketene with silicate ester amine to yield a compound having a β-ketoamide group at one end and a silicate ester at the other end. For example, a dimethylketene dimer can be reacted wit a trialkoxysylyltrimethyleneamine in accordance with the following:

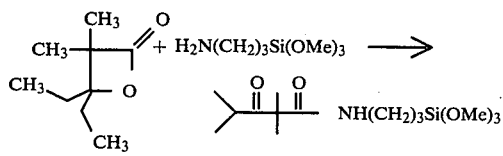

The foregoing product has an initiator precursor on one end and a coupling agent on the other. The next step is to attach the coupling agent to a surface, such as glass:

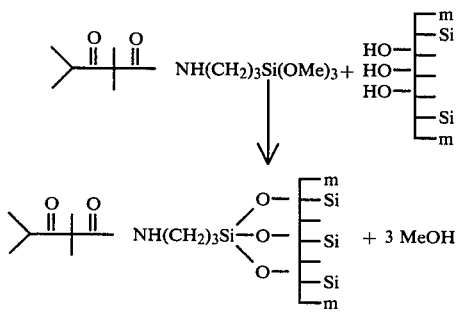

Because of the temperature coefficient characteristics of β-ketoamide systems, this material may now be mixed with catalyzed monomer at a low temperature as, for example, below about 130° C. When the mixture is heated to reaction temperatures (e.g. above about 160° C.) as by pouring it into a heated mold, the surface material will decompose to yield a nascent isocyanate (initiator species) and a ketone. Generally the ketene dimer from which the β-ketoamide is synthesized may be selected so that the ketone, which is a biproduct in the formation of the initiator species, will volitalize and leave the system during polymerization.

Other readily available and suitable ketene dimers that may be used in a similar synthesis include, for example, dimethylketene, diethylketene and methylethylketene. A generalized structure of the ketene dimers useful in the practice of this invention is as follows:

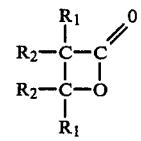

where
$R_1$ is an alkyl chain from $C_1$ to $C_4$;
$R_2$ is H or alkyl from $C_1$ to $C_4$.

Preferably, for practical reasons, it is better to select $R_1$ and $R_2$ to be either methyl or ethyl. It may be noted that diketene ($R_1 = R_2 = 0$) will serve but its volatility makes it impractical to use.

As noted above, the silica ester amines are sometimes used for as a sizing material, as on fiberglass. In this case, it may be possible to react a ketene dimer directly with the sized glass fiber or other sized filler material without going through the intermediate of preparing a β-ketoamide silicate ester. For this to be effective, however, there should be little or no residual hydroxyl groups or adsorbed water on the surface of the mineral.

EXAMPLE 1

A mixture of 75 ml. dry cyclohexane and 7.0 g. Eastman technical dimethylketene dimer were placed in a 250-ml. flask equipped with a dropping funnel and reflux condensor. A second solution of triethoxysilyltrimethyleneamine (Dow Corning A-1100) in 50 ml. dry heptane was placed in the dropping funnel and then was slowly added to the stirred solution. After addition was completed, the resulting solution was refluxed for one hour during which time the solution turned to a light yellow color.

The solvents were removed by use of a rotary evaporator with a water aspirator. The resulting oil was distilled in vacuum to give, after a small forecut, a clear liquid whose boiling point was 134° C. at 0.1 mm pressure. This clear liquid solidified upon standing. Total yield of purified solid (m.p. 35° C.) was 13.0 g. (72% of theory).

An infrared spectrum of the solid in chloroform showed the absence of ketene dimer carbonyl bands and the presence of bands indicative of a β-ketoamide. the structure adopted for this compound was N-(triethoxysilyltrimethylene)-2,2,41 -trimethyl-β-ketopentanamide (1).

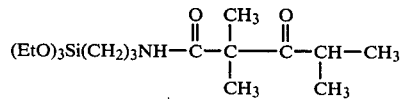

EXAMPLE 2

The same reaction as example 1 was carried out using 2-ethylketene dimer as the starting diketene. A liquid whose boiling point was 150° C. at 0.1 mm was isolated in 95% yield. After infrared analysis, this compound was characterized as N-(triethoxysilyltrimethylene)-2-ethyl-β-keto-hexanamide (11).

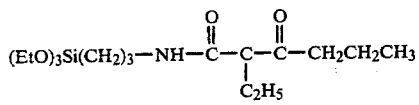

EXAMPLE 3

A slurry of 20 g. finely ground aluminum silicate in 100 ml. dry chloroform was mixed with a solution of 3.2 g. of (1) in 20 ml chloroform. This mixture was stirred and refluxed for two hours. After cooling, the solvent was evaporated on a vacuum rotary evaporator. The solid was broken up with a spatula to yield a fine white powder. Washing this powder with additional small amounts of chloroform showed no carbonyl bands in the concentration of the wash chloroform. The total yield of coated powder was 21.8 g. (98% of theory).

EXAMPLE 4

A similar preparation was made using compound (11) and aluminum silicate. Other preparations included the application of (1) and (11) to both ¼" chopped glass fiber and finely divided silica powder.

EXAMPLE 5

A test tube slurry was made with 50 g. of aluminum silicate that had been coated with coupler/initiator (1) suspended in 45 g. molten caprolactam at 80° C. This mixture was calculated to contain 0.957 g. of initiator/coupler (1). In another test tube 0.127 g. of 50% NaH suspension in mineral oil was dissolved in 5 g. molten caprolactam. These two solutions were mixed together in the first test tube to give a molar ratio of monomer:initiator/coupler:catalyst of 100:1:1. The resulting fluid mixture was placed in an oil bath at 160° C. Within two minutes the mobile slurry reacted to a gel-like state. The reacted material was kept in the 160° C. bath for a total of one hour.

After freeing the cast rod from the test tube, the appearance of the slightly gray material is lustrous and smooth, seemingly a continuous single solid phase. The specimen tenaciously resisted cutting and dulled all cutting tools upon machining. The specimen was insoluble in all polyamide solvents, suggesting a densely cross-linked polymer structure. Thermal analysis with a differential scanning calorimeter showed the presence of crystallites with a melting point range of 190°–224° C. Water extractables were 7.8% and consisted of unreacted caprolactam and polycaprolactam lower oligomers.

A standard ASTM tensile specimen set was machined from this and similar specimens. Tensile testing on this sample gave a tensile modulus of $1.8–2.0 \times 10^6$ psi with a tensile elongation at break of 1–2%. Conventional coupling agents and methods give tensile moduli of around $1.2–1.5 \times 10^6$ psi, while ordinary unfilled polyamides have moduli of around $2–3 \times 10^5$ psi.

EXAMPLE 6

A similar preparation was made using laurinlactam as the starting lactam. Similar inhancements of properties were noted. Tensile modulus was $1.4 \times 10^6$ psi.

EXAMPLE 7

Caprolactam was cast with initiator/coupler (1) at various temperature and relative concentrations. The following table is a summary of these results. Mineral filler in all cases was silica (30%).

| | Gel Times | | |
|---|---|---|---|
| Mole ratio | 140° C. | 160° C. | 180° C. |
| 100:1:1 | 5.5 min | 1.7 min | 0.9 min |
| 200:1:1 | 11.3 min | 3.2 min | 2.3 min |
| 400:1:1 | 25.0 min | 13.5 min | 7.3 min |

EXAMPLE 8

Various minerals and filler levels were cast. The following table gives the results. Initiator/coupler was compound (1).

| Filler & Level | Molar Ratio | Gel Time (min) | Temp. (°C.) |
|---|---|---|---|
| 10% Glass fiber | 100:1:1 | 2.0 | 180 |
| 10% silica | 100:1:1 | 1.5 | 180 |
| 20% silica | 100:1:1 | 2.0 | 180 |
| 30% silica | 100:1:1 | 3.5 | 180 |
| 40% silica | 100:1:1 | 9.0 | 180 |
| 20% silica | 100:1:1 | 2.0 | 180 |
| 10% alumina | 100:1:1 | 1.8 | 180 |
| 20% alumina | 100:1:1 | 2.4 | 180 |
| 30% alumina | 100:1:1 | 3.7 | 180 |
| 40% alumina | 100:1:1 | 5.2 | 180 |

All cast pieces gave physical properties within the range quoted in example 5. In all cases, the monomer was caprolactam and the catalyst was the NaH suspension.

I claim:
1. A method of reinforcing a polylactam comprising the steps of:
   reacting a ketene with an amino silicate ester to form a β keto-amide and a reactive silicate ester end group;
   treating the surface of inorganic filler particles by reaction with the silicate ester end group;
   dispersing the treated filler particles in a lactam monomer; and
   adding a catalyst and heating the dispersion to initiate a base catalyzed, anionic polymerization of the lactam.
2. A method according to claim 1 wherein the lactam has the general formula

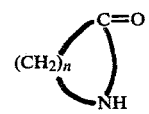

in which n is between 2 and 15.

3. A method according to claim 2 wherein the lactam is caprolactam.
4. A method according to claim 2 wherein the lactam is laurinlactam.

5. A method according to claim 1 wherein a copolymer is formed by polymerizing a mixture of lactams.

6. A method according to claim 5 wherein the mixture of lactams includes caprolactam and laurinlactam.

7. A method of reinforcing a polylactam comprising treating the surface of an inorganic filler with an amino silicate ester, reacting the amino group of the silicate ester with a ketene to form a β-keto amide, dispersing the filler in lactam monomer, and polymerizing the lactam in a base catalized, anionic polymerization system.

* * * * *